(12) United States Patent
Fischer

(10) Patent No.: US 7,290,460 B2
(45) Date of Patent: Nov. 6, 2007

(54) ELECTRO-PNEUMATIC SWITCHING UNIT

(75) Inventor: Dieter Fischer, Nonnenhorn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 180 days.

(21) Appl. No.: 10/531,341

(22) PCT Filed: Nov. 6, 2003

(86) PCT No.: PCT/EP03/12371

§ 371 (c)(1),
(2), (4) Date: Apr. 15, 2005

(87) PCT Pub. No.: WO2004/044462

PCT Pub. Date: May 27, 2004

(65) Prior Publication Data

US 2006/0011241 A1    Jan. 19, 2006

(30) Foreign Application Priority Data

Nov. 12, 2002  (DE) ................................. 102 52 429

(51) Int. Cl.
- F16H 59/00 (2006.01)
- F16H 61/00 (2006.01)
- F16H 63/00 (2006.01)

(52) U.S. Cl. ....................................................... 74/335

(58) Field of Classification Search ................ 477/125; 701/62; 74/335
See application file for complete search history.

(56) References Cited

U.S. PATENT DOCUMENTS

| | | | |
|---|---|---|---|
| 5,471,893 A | * | 12/1995 | Newbigging ................. 74/335 |
| 5,911,787 A | * | 6/1999 | Walker ......................... 74/335 |
| 6,361,473 B1 | * | 3/2002 | Mason et al. ............... 477/124 |

FOREIGN PATENT DOCUMENTS

| | | |
|---|---|---|
| DE | 2 040 195 | 2/1972 |
| DE | 25 02 445 | 8/1975 |
| DE | 31 41 271 A1 | 5/1983 |
| DE | 100 29 497 A1 | 1/2002 |

* cited by examiner

Primary Examiner—Tisha Lewis
(74) Attorney, Agent, or Firm—Davis Bujold & Daniels, P.L.L.C.

(57) ABSTRACT

An electro-pneumatic switching unit for a vehicle transmission (6) comprising one splitter group transmission (12) pneumatically switched via valves (36, 38) and one range-change group transmission (14) pneumatically switched via valves (44, 46), the switchings of which are manually preselected by the vehicle driver on a gear lever (16), has one locking device (54, 56) for mechanically preventing the manual switching of inadmissible reduction ratios of the vehicle transmission (6), one device (30, 42, 64) for preventing the pneumatic switching of inadmissible reduction ratios and one electronic control device (20). The locking device (54, 56) for mechanically preventing the manual switching of inadmissible reduction ratios is pneumatically connected with one valve (44) for switching the range-change group transmission (14).

4 Claims, 4 Drawing Sheets

ELECTRO-PNEUMATIC SWITCHING UNIT

According to the preamble of claim 1 the invention concerns an electro-pneumatic switching unit.

Transmissions of large industrial vehicles are divided in a main transmission part, a splitter group transmission and a range-change group transmission. Modern transmissions, mainly in industrial vehicles, have one switching device assisted by a pneumatic tire which carries out pneumatic switches in the splitter group transmission and in the range-change group transmission while the switches in the main transmission part are manually carried out by the vehicle driver and can be assisted here by the pneumatic tire in the power to be exerted.

Electronic systems have been increasingly provided for control of motor vehicle transmissions commonly used at present. These systems serve, together with other purposes, to prevent switchings in the transmission which are not admissible due to different conditions especially such as vehicle speeds, which are too high, relative to the gear intended to be switched.

DE 100 29 497 A1 discloses an electro-pneumatic switching unit or a multi-gear vehicle transmission where, with a plurality of controlled valves, the transmission is switched from several assemblies and, at the same time, is electronically monitored for preventing malfunctions. To that end, the valves are controlled by a central vehicle guide computer. The disclosed contents of DE 100 29 497 A1 are to be, in all extent, object of this description. Control of the supporting power does not take place.

The problem on which this invention is based is to provide a pneumatic switching device which simplifies the existing systems.

The problem is solved by the features of claim 1. One development is object of the sub-claim.

An electro-pneumatic switching unit for a vehicle transmission has one splitter group transmission pneumatically switched via valves and one range-change group transmission pneumatically switched via valves, the switchings of which can be manually pre-selected by the vehicle driver on a gear lever. The switching unit also has one locking device for mechanically preventing the pneumatic switching of inadmissible reduction ratios of the vehicle transmission, the same as one electronic control device. The locking device for mechanically preventing the manual switching of inadmissible reduction ratios of the vehicle transmission is pneumatically connected with one valve for switching the range-change group transmission. Compared to the former switching units, it is thereby possible to spare a pneumatic valve together with the control thereof and the space to be otherwise provided therefor. In the control device can be eliminated the connection to be otherwise provided, which represents an advantage in cost. This valve is preferably the valve for engaging the slow position of the range-change group transmission.

The invention is explained in detail with reference to drawings which shows:

Figure 1:
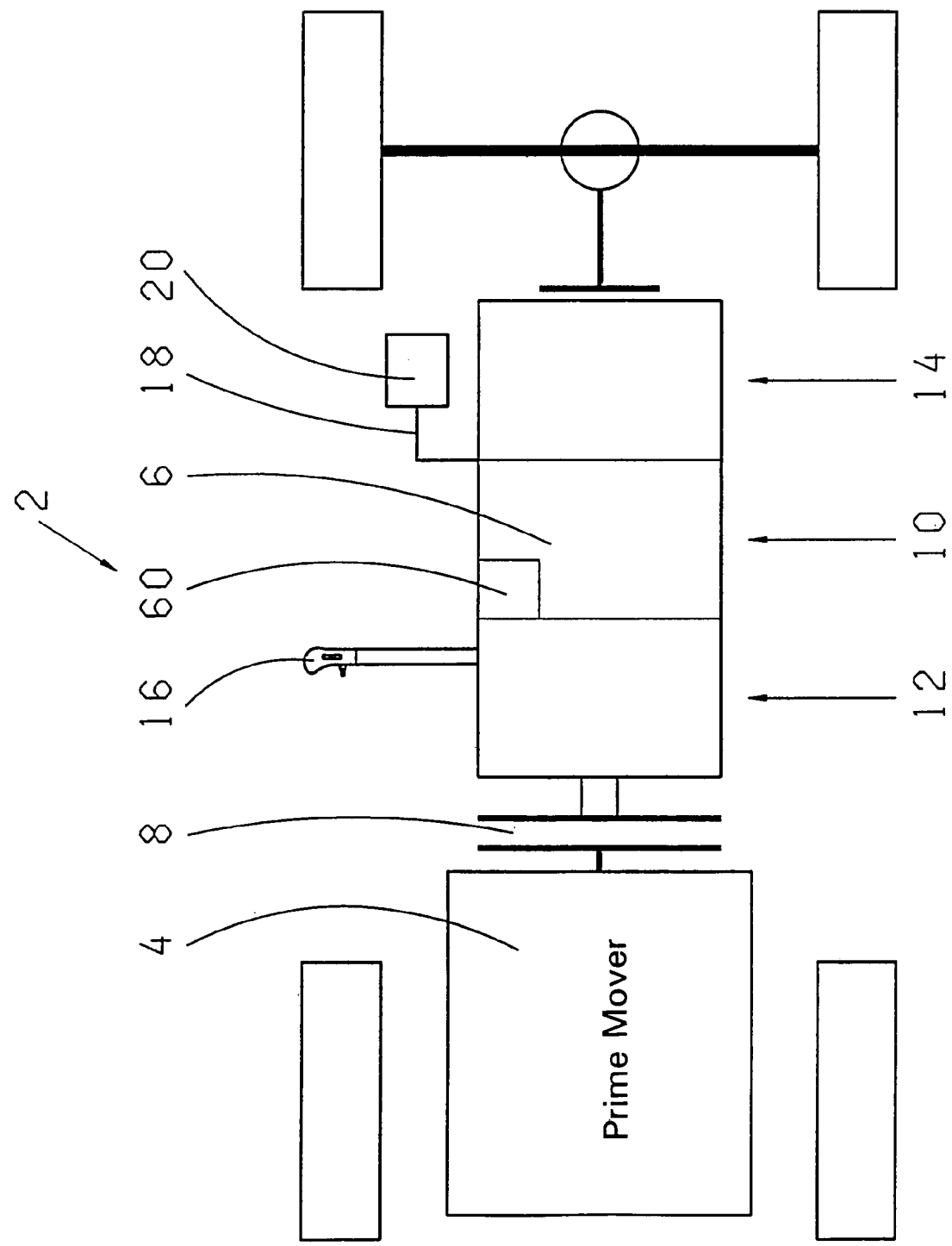
FIG. 1 is a diagrammatic group with arrangement of the transmission.

FIG. 1 shows a vehicle 2 having one prime mover 4, one transmission 6 and one clutch 8 disposed therebetween. The transmission 6 has one main transmission part 10, one splitter group transmission 12 and one range-change group transmission 14. The main transmission part 10 is manually switched by a gear lever 16. The transmission 6 is connected via connecting lines 18 with an electronic control device 20.

Figure 2:
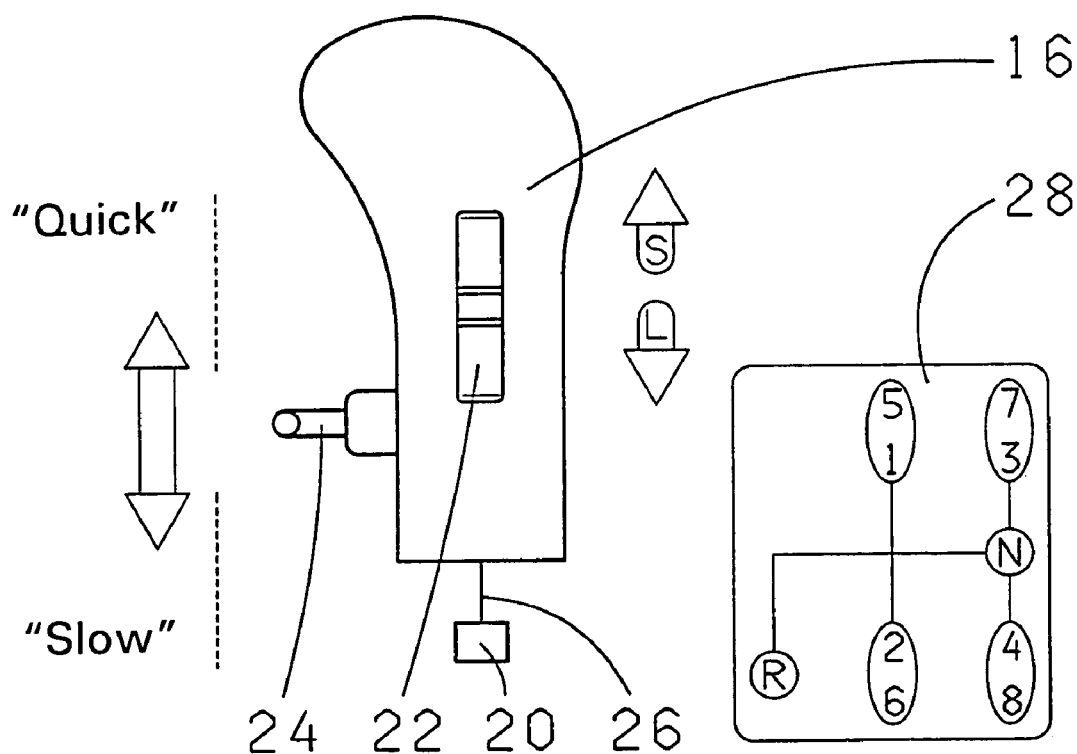
FIG. 2 is a typical gear change knob with gear shift pattern.

FIG. 2 shows, by way of example in enlarged representation, one gear lever 16 for a gear shift pattern 28 designated as "superimposed H". On the side of the gear lever 16 is located one toggle switch 22 to preselect the switching of the splitter group transmission 12. On the front side of the gear lever 16 is provided one other toggle switch 24 of which the range-change group transmission 14 is switched. Both toggle switches 22, 24 are electric switches connected via one electric connecting line 26 with the control device 20. In one switching with the gear shift pattern 28, every end position of the gear lever 16 is coordinated in the forward gears with two ratio steps which respectively differ by the speed ratio change of the range-change transmission 14. The reduction ratios one to four and the reverse gear are switched in the toggle elver position "slow"; the gears five to eight are switched in the toggle lever position "quick". The neutral position of the main transmission part 10 is situated in the gate between the reduction ratios three and four or seven and eight.

The vehicle driver has to preselect the change of the range-change group transmission 14 on the gear lever 6 by way of the toggle switch 24. The change is achieved as soon as the neutral position is manually engaged in the main transmission part 10.

Figure 3:
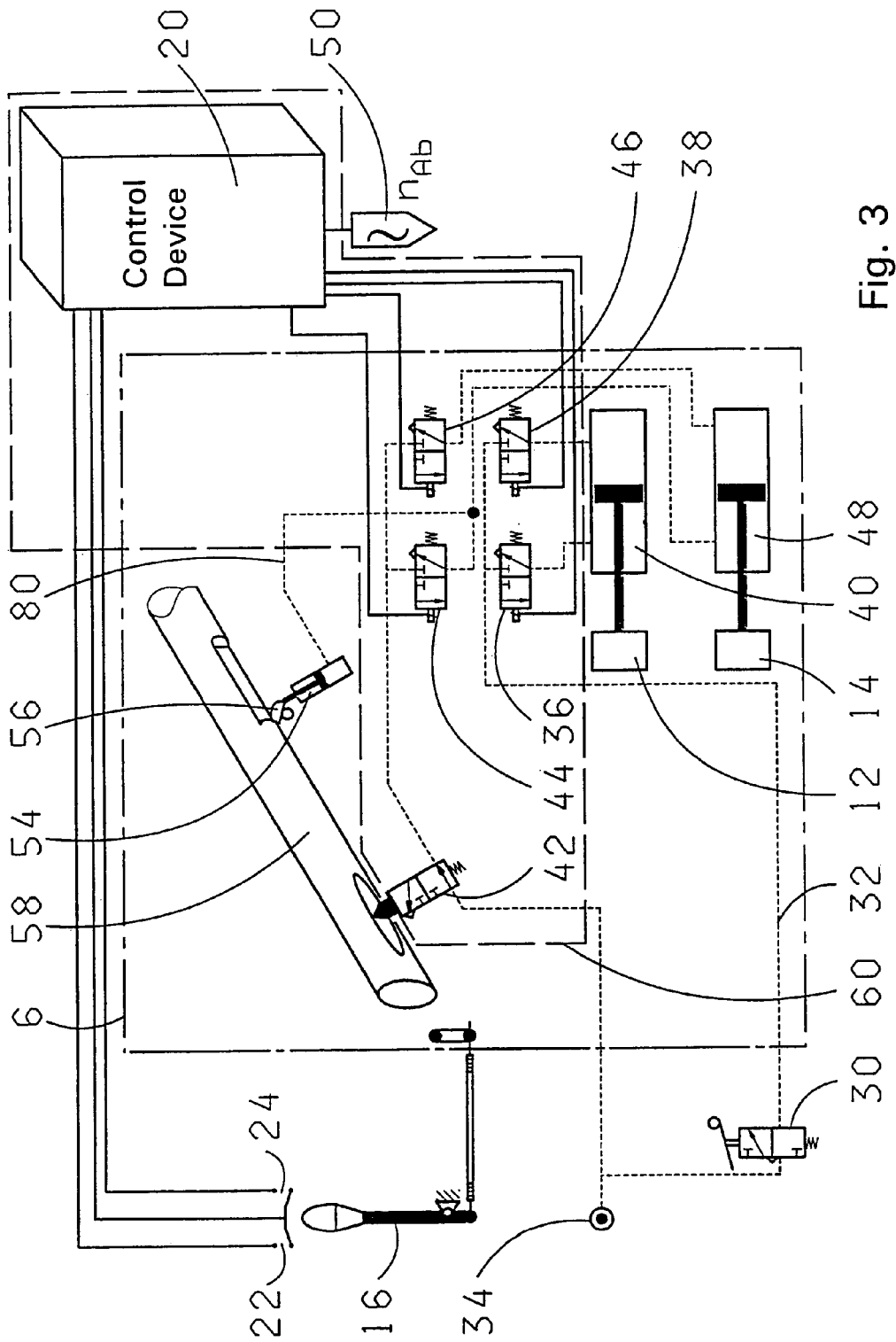
FIG. 3 is a first development of the switching unit with clutch release valve.

The splitter group transmission 12 is preselected to the position "L" or "S" with the toggle switch 22 at the side of the gear lever 16 and is engaged by actuating the clutch 8. FIG. 3 shows for the purpose one pneumatic clutch release valve 30 which is located in one line 32 between an air reservoir 34 and two electro-pneumatic 3/2 directional valves 36 and 38. The clutch release valve 30 allows air into the valves 36 and 38 only when the clutch pedal is actuated. The valves 36 and 38 are connected with the electronic control device 20 and controlled in accordance with the position of the toggle switch 22 on the gear lever 16. When the clutch pedal is pressed, air is allowed either into the left or into the right chamber of a switch cylinder 40 of the splitter group transmission 12, the respective other chamber being then aerated via the valves 36 and 38.

As already mentioned, the vehicle driver has to preselect the change of the range-change group transmission 14 on the gear lever 16 by way of the toggle switch 24. The change is then achieved as soon as the neutral position has been manually engaged in the main transmission part 10. In the neutral position, one main disengaging valve 42, mechanically coupled with the switching motion, releases air from the air reservoir 34 to two electro-pneumatic 3/2 directional valves 44 and 46. The valves 44 and 46 are connected with the electronic control device 20 and controlled in accordance with the switching position of the toggle switch 24 on the gear lever 16. When the neutral position is detected by the main disconnecting valve 42, via the respective controlled valve 44 or 46, air is allowed either into the left or into the right chamber of a switch cylinder 48 of the range-change group transmission 14, the respective other chamber being then aerated via the non-controlled valve 46 or 44.

To prevent erroneous switchings, additional fuse protections have to be present in the switching device. To that end, one gate locking cylinder 54 is provided which preferably in the slow ratio step of the range-change group transmission, above a certain output rotational speed of the transmission 6, prevents the switching from the right switching gate of the gear shift pattern 28 to the left switching gate, that is, the switching from the third or fourth ratio step to the first or second ratio step is prevented. This should keep the vehicle driver from erroneously switching to the first instead of to the fifth ratio step, when he has forgotten to preselect the quick ratio in the range-change group transmission with the toggle switch 24. Air exists on the gate locking cylinder 54 only when the main disengaging valve 42 in the neutral position of the main transmission part 10 allows air into the valves 44 and 46 and when the valve 44, which is here to engage the slow position, here the slow position of the range-change group transmission 14 should turn on, is controlled by the control device 20. The gate locking cylinder is directly connected with the output of said valve. In the gear shift pattern 28, if the gear lever 16 is in the position for the fourth ratio step, the range-change group transmission 14 is then in the slow position. The output rotational speed of the transmission 6 is detected by a sensor 50 and relayed as a signal to the electronic control device 20. If the gear lever 16 is brought to the neutral position, air flows via the main disconnecting valve 42 to the valves 44 and 46. When the output rotational speed is too high, the control device 20 emits one signal to the valve 44, which opens and allows air to reach the gate locking shaft 48 via a line 80 and presses the latter in direction of the right switching gate of the gear shift pattern 28. If the vehicle driver preselects the quick ratio in the range-change group transmission 14 with the toggle switch 24, the valve 44 closes and the valve 46 opens. Thereby no more air exists on the gate locking cylinder 54 and the gear lever can be passed into the left switch gate in the gear shift pattern 28. This arrangement can be over-pressurable by the vehicle driver at increased cost in power and thus allow the switching of the ratio steps to the left switch gate of the gear shift pattern 28 in extreme situations.

Above a predetermined vehicle speed, a group lock prevents the switching of the range-change group transmission 14 to the ratio slow and protects both the synchronization of the range-change group transmission 14 and the synchronization of the main transmission part 10. The vehicle speed is detected via the sensor 50 according to the transmission output rotational speed and is relayed as a signal to the control device 20. According to said signal the control device 20 controls the valves 44 and 46 and allows a switching to the ratio slow only in the presence of corresponding admissible signals.

The valves 36, 38, 42, 44 and 46 are jointly accommodated in a valve block 60 as common housing which is directly mounted on the selector shaft 58 of the transmission 6. Through it a compact unit of a valve block 60 arises that is arranged at the transmission 6 (FIG. 1). By virtue of the short line lengths between the individual valves, short reaction times and switching times advantageously result. The valve block 60 and the control device 20 can be electrically connected via a central electric terminal on the valve block 60. The valve block 60 can be attached to an existing transmission without structural changes of the transmission being needed. The gate locking cylinder 54 is situated directly next to the valve block 60 so that short pipe lengths are also provided here.

Figure 4:
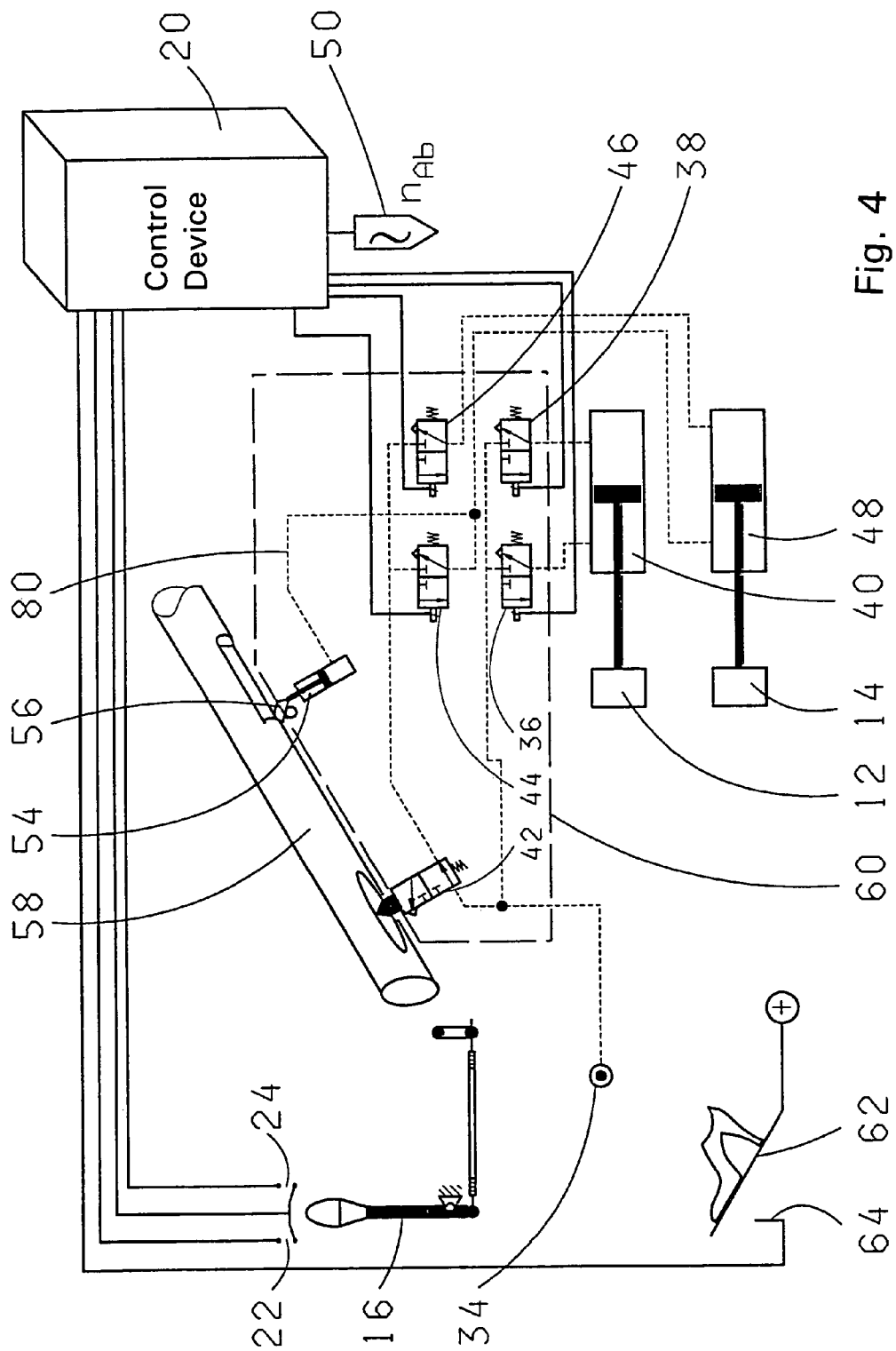
FIG. 4 is a second development of the switching unit with clutch release switch.

FIG. 4 shows a modification of the arrangement of FIG. 3. The gate locking cylinder 54 is here likewise integrated in the valve block and the modularity and complexity of the valve block 60 are thus further increased. The clutch pedal 62 actuates here an electric switch 64 connected with the control device 20. The admission of switchings in the splitter group transmission 12 is determined in this arrangement by the control device 20 when the switch 64 is closed, air permanently outcropping on the valves 36 and 38.

REFERENCE NUMERALS 2 vehicle 36 valve
4 prime mover 38 valve
6 transmission 40 shift cylinder
8 clutch 42 main disconnecting valve
10 main transmission part 44 valve
12 splitter group transmission 46 valve
14 range-change group transmission 48 switch cylinder
16 gear layer 50 sensor
18 connecting line 52 valve
20 control device 54 gate locking cylinder
22 toggle switch 56 relay lever
24 toggle switch 58 selector shaft
26 connecting line 60 valve block
28 gear shift pattern 62 clutch pedal
30 clutch release valve 64 switch
32 line
34 air reservoir

The invention claimed is:

1. An electro-pneumatic switching unit for a vehicle transmission (6) comprising;
    a splitter group transmission (12) pneumatically switched via a first set of valves (36, 38);
    a range-change group transmission (14) pneumatically switched via a second set of valves (44, 46), and switching of which can be manually preselected by a vehicle driver via a gear lever (16);
    a mechanical locking device (54, 56) for mechanically preventing the manual switching of inadmissible reduction ratios of a vehicle transmission (6);
    a prevention device (30, 42, 64) for preventing pneumatic switching of the inadmissible reduction ratios of the vehicle transmission (6); and
    an electronic control device (20),
        wherein the mechanical locking device (54, 56), which prevents the vehicle transmission from performing the manual switching of inadmissible reduction ratios of the vehicle transmission (6), is pneumatically actuated by a first valve (44) of the second set of valves (44, 46) for switching the range-change group transmission (14) according to a gear ratio range of the second set of valves (44, 46).

2. The electro-pneumatic switching unit according to claim 1, wherein the mechanical locking device (54, 56) is pneumatically connected with the first valve (44) of the second set of valves (44, 46) for switching the position slow of the range-change group transmission (14).

3. An electro-pneumatic switching unit for a vehicle transmission (6) that includes:
    a splitter group transmission (12) pneumatically switched via a first set of valves (36, 38); and
    a range-change group transmission (14) that is pneumatically switched between a first range and a second range via a second set of valves (44, 46);
    wherein switching of the second set of valves (44, 46) can be manually preselected by a vehicle driver via a gear lever (16), and the switching unit comprising:
    an electronic control device (20) for controlling switching of the first and second sets of valves (36, 38, 44, 46);
    a disengaging valve (42) mechanically coupled with the gear lever (16) and pneumatically coupled with the second set of valves (44, 46) to pneumatically actuate the second set of valves (44, 46) when the gear lever (16) is in a neutral position;

the switching of the range-change group transmission (14) is controlled by the electronic control device (20) when the second set of valves (44, 46) are actuated by the disengaging valve (42); and a locking device (54, 56) is pneumatically actuated by the second set of valves (44, 46) according to a gear ratio range of the second set of valves (44, 46) and mechanically coupled with the gear lever (16) to mechanically prevent the manual switching of inadmissible reduction ratios of the vehicle transmission (6).

4. The electro-pneumatic switching unit according to claim 3, wherein the locking device (54, 56) is pneumatically connected with the first valve (44) of the second set of valves (44, 46) for switching a slow range of the range-change group transmission (14).

* * * * *